(12) United States Patent  
McGowan et al.

(10) Patent No.: US 9,329,628 B2  
(45) Date of Patent: May 3, 2016

(54) HANDHELD ELECTRONIC DEVICE USER SUPPORT CASE

(71) Applicant: Ambulant, Inc., San Francisco, CA (US)

(72) Inventors: Joseph Cole McGowan, San Francisco, CA (US); Harry W. McGowan, Chico, CA (US)

(73) Assignee: AMBULANT, INC., San Francisco, CA (US)

( * ) Notice: Subject to any disclaimer, the term of this patent is extended or adjusted under 35 U.S.C. 154(b) by 0 days.

(21) Appl. No.: 13/668,046

(22) Filed: Nov. 2, 2012

(65) Prior Publication Data

US 2014/0124388 A1    May 8, 2014

(51) Int. Cl.  
*H05K 5/00* (2006.01)  
*G06F 1/16* (2006.01)

(52) U.S. Cl.  
CPC .................................. *G06F 1/1626* (2013.01)

(58) Field of Classification Search  
CPC ..... G06F 1/1613; G06F 1/1626; G06F 1/181; H05K 5/00  
USPC ................. 206/305, 320; 361/679.01, 679.3, 361/679.59  
See application file for complete search history.

(56) References Cited

U.S. PATENT DOCUMENTS

| | | | |
|---|---|---|---|
| 5,100,098 A * | 3/1992 | Hawkins .................. | 361/679.59 |
| 6,016,248 A * | 1/2000 | Anzai et al. .............. | 361/679.59 |
| 6,301,101 B1 * | 10/2001 | Anzai et al. ................ | 361/679.3 |
| 6,781,824 B2 * | 8/2004 | Krieger et al. ............. | 361/679.3 |
| 7,428,143 B1 * | 9/2008 | Jones et al. .............. | 361/679.55 |
| 8,243,444 B2 * | 8/2012 | Kawada et al. ........... | 361/679.59 |
| 8,670,233 B2 * | 3/2014 | Huang et al. ............. | 361/679.59 |
| 2011/0299231 A1 * | 12/2011 | Gaddis et al. ............ | 361/679.01 |
| 2012/0044624 A1 * | 2/2012 | Hoffman et al. ......... | 361/679.59 |
| 2012/0224318 A1 * | 9/2012 | Carleton .................. | 361/679.26 |
| 2012/0262854 A1 * | 10/2012 | Robert ..................... | 361/679.01 |
| 2013/0005401 A1 * | 1/2013 | Rosenhan et al. ........... | 455/557 |

* cited by examiner

*Primary Examiner* — Bryon Gehman  
(74) *Attorney, Agent, or Firm* — Maschoff Brennan

(57) ABSTRACT

A body to support a handheld electronic device and at least one arm coupled to the body. The at least one arm include at least one radius value that is based on a thenar measurement.

16 Claims, 8 Drawing Sheets

HANDHELD ELECTRONIC DEVICE USER SUPPORT CASE

TECHNICAL FIELD

The present disclosure relates to handheld electronic devices, and more particularly, to a user support case for a handheld electronic device.

BACKGROUND

A large and growing population of users enjoys entertainment through the consumption of digital media items, such as electronic books (also referred to herein as e-books), electronic newspapers, electronic magazines, digital movies, audio books, and other digital content. Users may employ various handheld electronic devices (also referred to herein as user devices) to consume digital media items. Among these electronic devices are electronic book readers (e-readers), cellular telephones, personal digital assistants (PDAs), portable media players, tablet computers, electronic pads, netbooks, desktop computers, notebook computers, and the like.

Some user devices may not be easily and/or comfortable held by some users. For example, some users may have to tightly grip the user device with his or her thumb and fingers. Other users may use both hands to hold the user device. Conventional e-reader cases require the user to firmly grip the device, usually causing pain in the hand or fingers within a short time (especially for people with arthritis).

BRIEF DESCRIPTION OF THE DRAWINGS

The present disclosure will be understood more fully from the detailed description given below and from the accompanying drawings of various implementations of the disclosure.

DETAILED DESCRIPTION

Described herein are implementations of a user support case for a handheld electronic device. The user support case can reduce the amount of effort needed by user to hold and use handheld electronic devices. The user support case can include a body to support a handheld electronic device and at least one arm coupled to the body. The at least one arm can include at least one radius value that is based on a thenar measurement.

Figure 1:
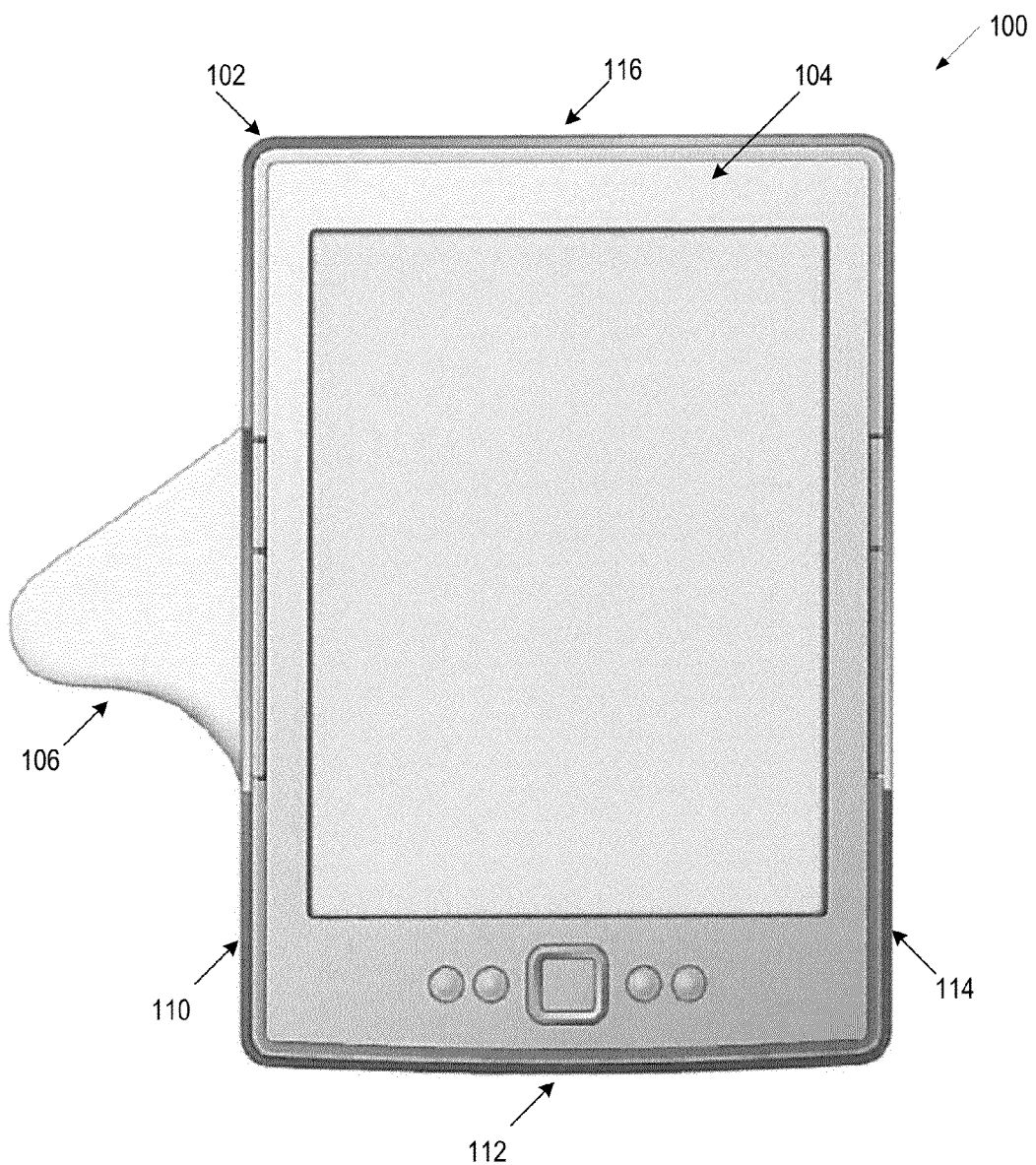
FIG. 1 illustrates a top view of an example user support case for a handheld electronic device.

FIG. 1 illustrates a top view of an example user support case 100 for a handheld electronic device. An electronic device can be a portable computing device such as an electronic book reader (e-reader) or a tablet computer. Other examples of handheld electronic device include, and are not limited to, cellular telephones, personal digital assistants (PDAs), portable media players, netbooks, laptop computers, and the like. For brevity and simplicity, an e-reader is used as an example of a handheld electronic device throughout this document. The case 100 can include a body 102 which can support an e-reader 104. For example, the e-reader 104 can be inserted into the body 102.

The following are example methods and materials that could be used to manufacture the case 100; whether it be used for the body 102 of the case 100 or used to fasten the e-reader 104 to the body 102 of the case 100, and are not limited to: elastic bands to securely fasten each of the four corners of the e-reader 104, a stretchy fabric in which the e-reader 104 can easily slide into and be securely fastened to the body 102 of the case 100, hard plastic "hooks" (as an extension of the body 102 of the case 100) that click into holes on the various styles of e-readers 104 and/or different size assemblies for different e-readers 104, solid wood or bamboo assemblies to encase and fasten the e-reader 104, paper, and rubber.

Additional options and add-ons to the case 100 can include, for example, and are not limited to, a Velcro® component on some portion of the case 100 for use in attaching the e-reader 104 to an object and/or surface. In another example, elastic and/or fabric straps may be added to the back of the case 100 to allow the case 100 to hang freely from the user's hand without requiring the user to grip the case 100 on the front and back with his or her fingers and thumb.

The body 102 can be coupled to one or more arms 106. In one implementation, each arm 106 is coupled to the body 102 via a pivot point 108. One implementation of a pivot point is described in greater detail below in conjunction with FIG. 7. In one implementation, the case 100 includes one arm 106. The arm 106 can be coupled to any side of the body 102. For example, the arm 106 may be coupled to the left-side 110 of the body 102, right-side 114 of the body 102, bottom-side 112 of the body 102, and/or top-side 116 of the body 102. In one implementation, the arm 106 is coupled to one side of the body 102 and can be detached from the body 102 and coupled to another side of the body 102.

Figure 2:
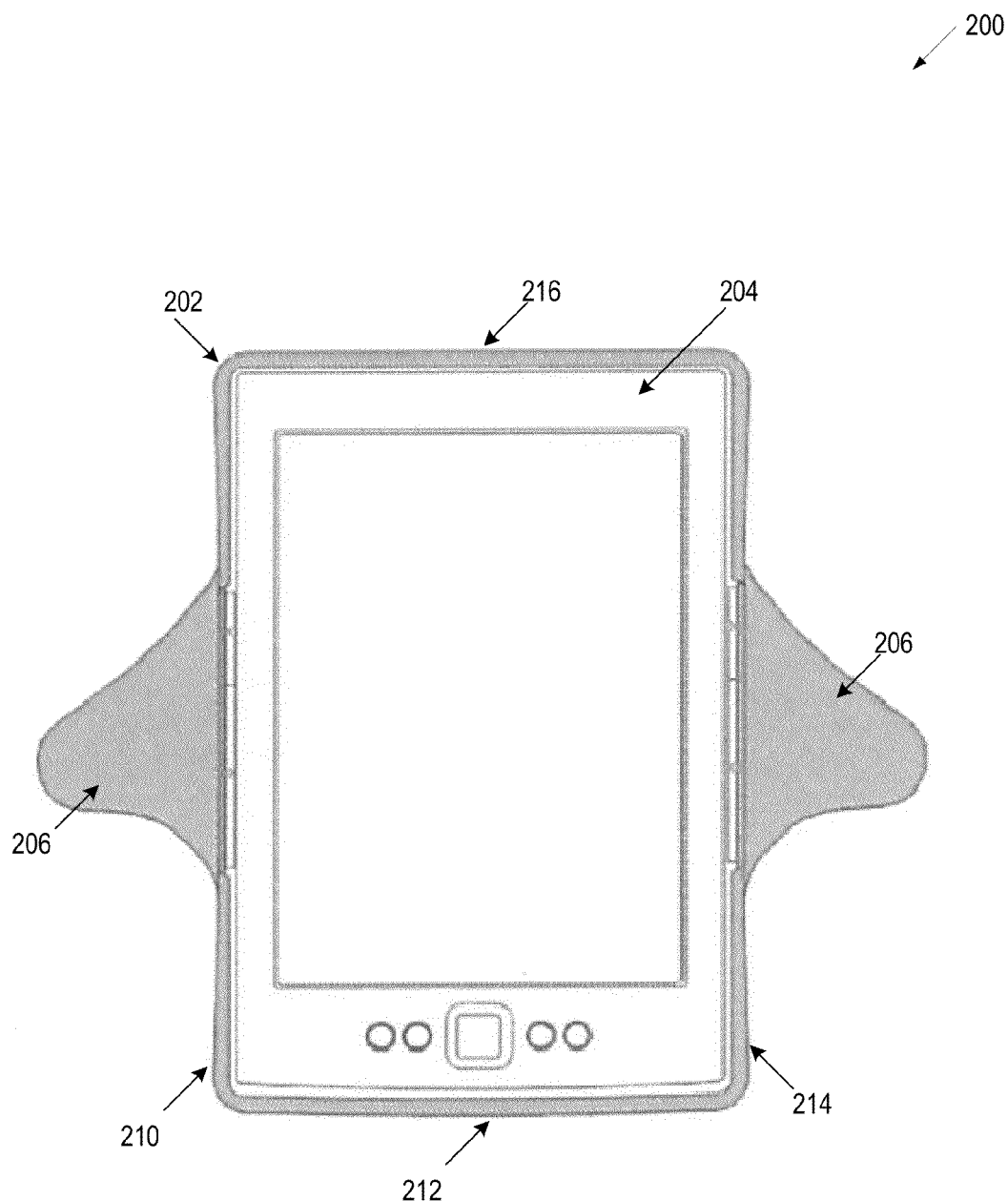
FIG. 2 illustrates a top view of one implementation of a case including two arms.

FIG. 2 illustrates a top view of one implementation of a case 200 including two arms 206. The two arms 206 can be coupled to any two sides of the body 202 of the case 200. In one implementation, the e-reader 104 may be configured to be viewed by a user in a portrait mode and the arms 206 may be coupled to the left-side 210 and the right-side 214 of body 202. In another implementation, the e-reader 104 may configured to be viewed by a user in a landscape mode and the arms 206 may be coupled to the left-side 212 and the right-side 216 of body 202. In one implementation, the arms 206 are coupled to two sides of the body 202 and the arms 206 can be detached from the body 202 and coupled to two other sides of the body 202.

Figure 3:
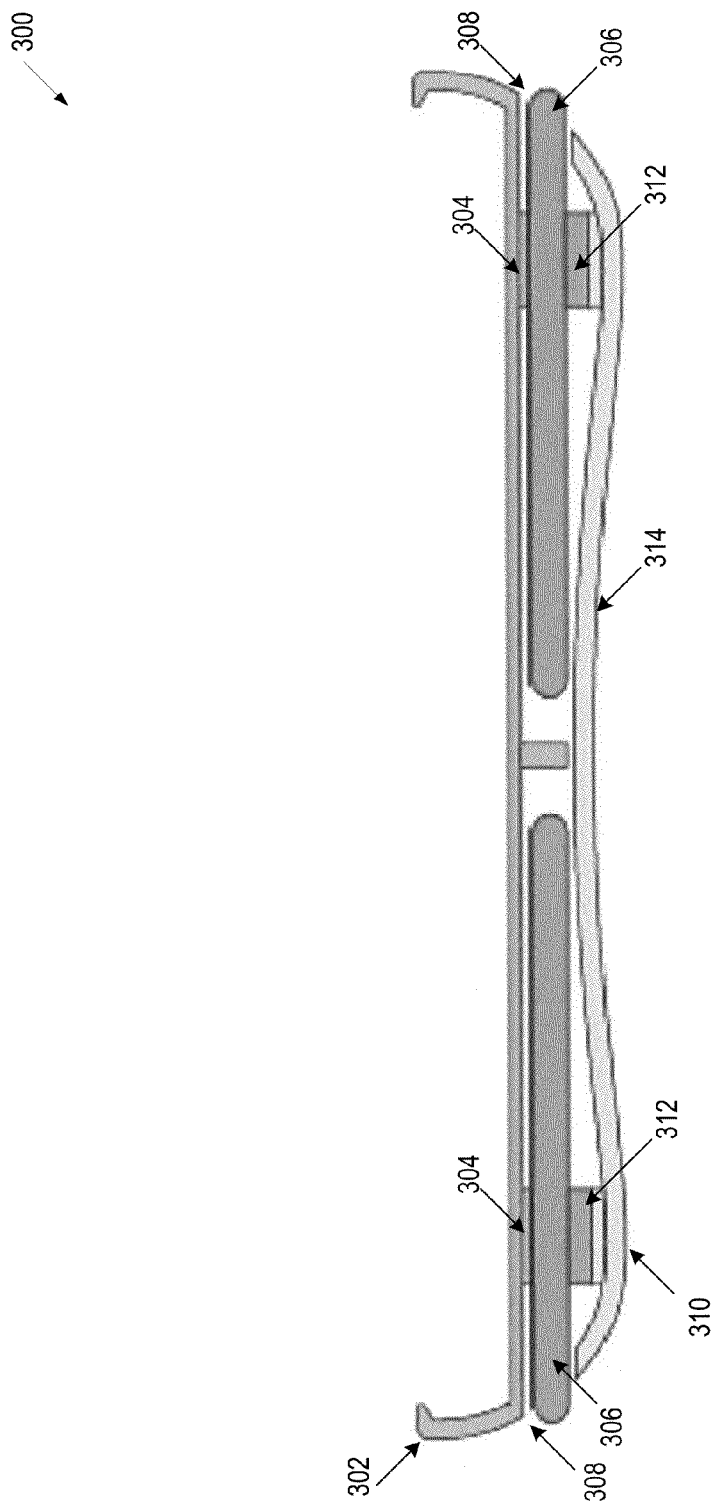
FIG. 3 illustrates a sectional view of one implementation of a case.

FIG. 3 illustrates a sectional view of one implementation of a case 300. In this illustration, an e-reader has not been inserted into the case 300. The case 300 can include two arms 306. In one implementation, the body (e.g., body 102 in FIG. 1) of the case 300 includes a first body portion 302 that is coupled to a top side of at least one arm 306 via a pivot point 304 and a second body portion 310 that is coupled to a bottom side of at least one arm 306 via a pivot point 312. In one implementation, the second body portion 310 has a flat surface. In another implementation, the second body portion 310 includes at least one recessed area 314. One implementation of a recessed area in a second body portion of a body of a case is described in greater detail below in conjunction with FIG. 6. The arms 306 can rotate into and out of one or more openings 308 in the case 300 via the pivot point 304, 312.

Implementations of an opening are described in greater detail below in conjunction with FIG. 5 and FIG. 6.

Figure 4:
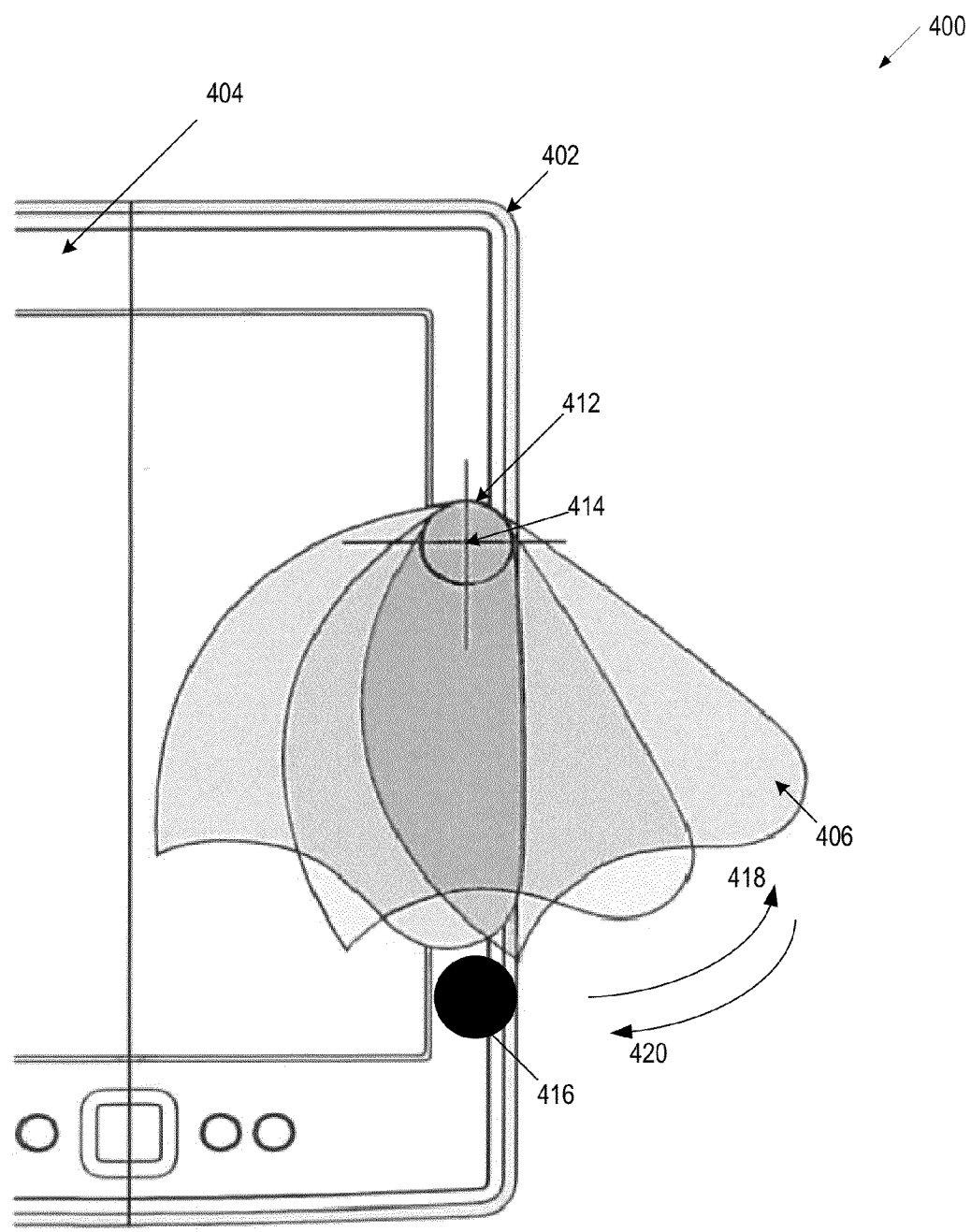
FIG. 4 illustrates a top view of one implementation of a portion of a case.

FIG. 4 illustrates a top view of one implementation of a portion of a case 400. The case 400 can include a body 402 to support an e-reader 404. The case 400 can include one or more arms 406 coupled to the body 402 via one or more pivot points 412. In one implementation, the location of the pivot point 412 is fixed on the body 402.

In another implementation, the location of the pivot point is adjustable on the body 402. For example, a user may have various reading positions and two arms 406 may be repositioned, instead of the center of two opposite sides of the body 402, but at near the top or bottom portion of each side to allow for the different user preferred reading positions.

In another example, the case 400 may be used by various users. A first user may prefer to have the location of the arms 406 pivot closer to the top portion of the case 400. Another user may prefer to have the location of the arms 406 pivot closer to the bottom portion of the case 400. For example, the location of the pivot point 412 may initially be at location 414 on the body 402 and may be moved, for example, by a user, to another location on the body 402. For example, the changed location may be location 416 on the body 402. In one implementation, the location of the pivot point 412 is adjusted by decoupling the arm 406 from a first location on the body 402 and re-attaching the arm 406 at a second location on the body 402. In another implementation, the location of the pivot point 412 is adjusted via a sliding mechanism in the body 402.

The arm 406 can rotate in an outward direction 418 out of an opening in the body 402 via the pivot point 412 and can rotate in an inward direction 420 into the opening in the body 402 via the pivot point 412. In one implementation, the case 400 includes a tension spring to rotate an arm 406 towards the body 402 and away from the body 402. The arm 406 can be flexible to bend and fold in order to store the case 400 in a smaller space.

Figure 5:
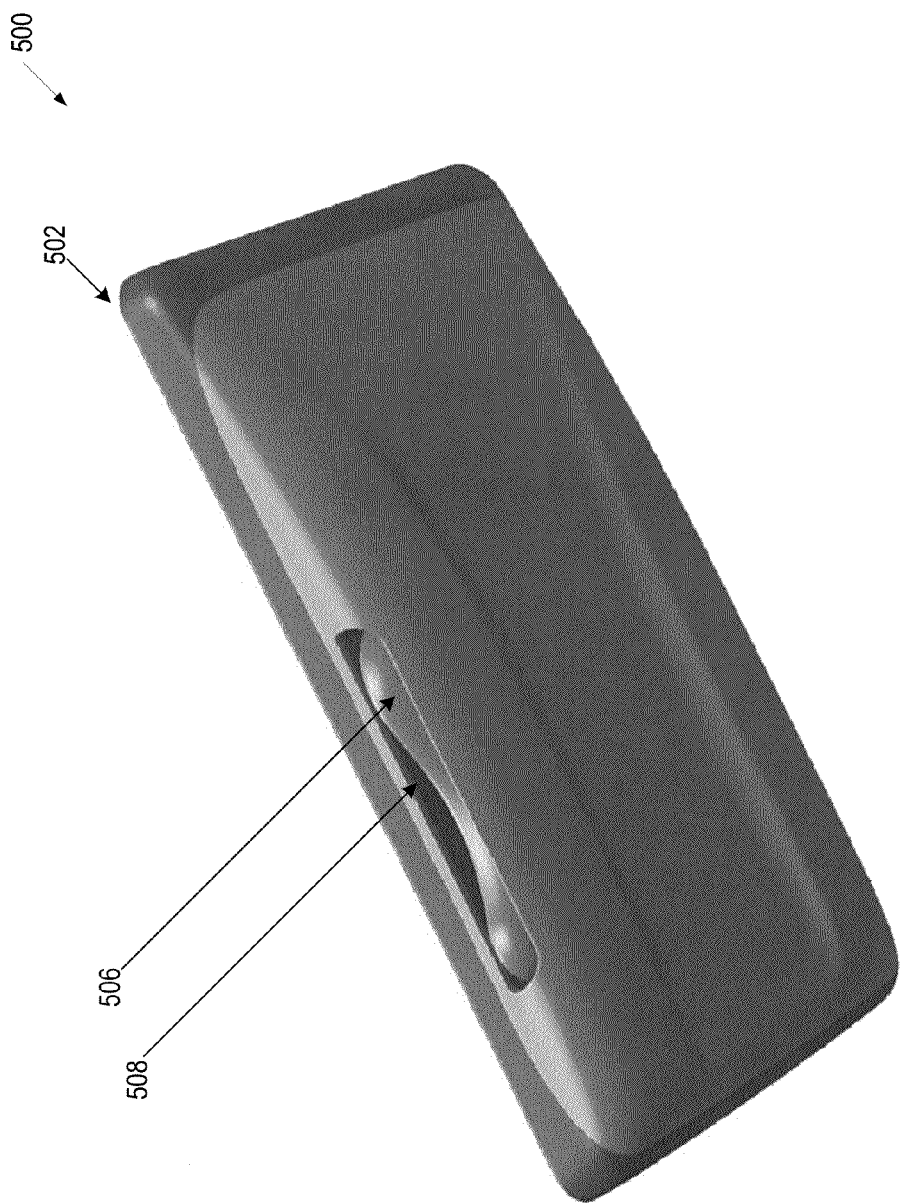
FIG. 5 illustrates a bottom view of one implementation of a case having an arm in a closed state.

FIG. 5 illustrates a bottom view of one implementation of a case 500 having an arm 506 in a closed state. A closed state can include an arm 506 being fully rotated inside an opening 508 in the body 502 of the case 500. In one implementation, the body 502 includes a locking mechanism to lock the arm 506 in a rotated position. The rotated position can include the arm 506 being in a closed state.

Figure 6:
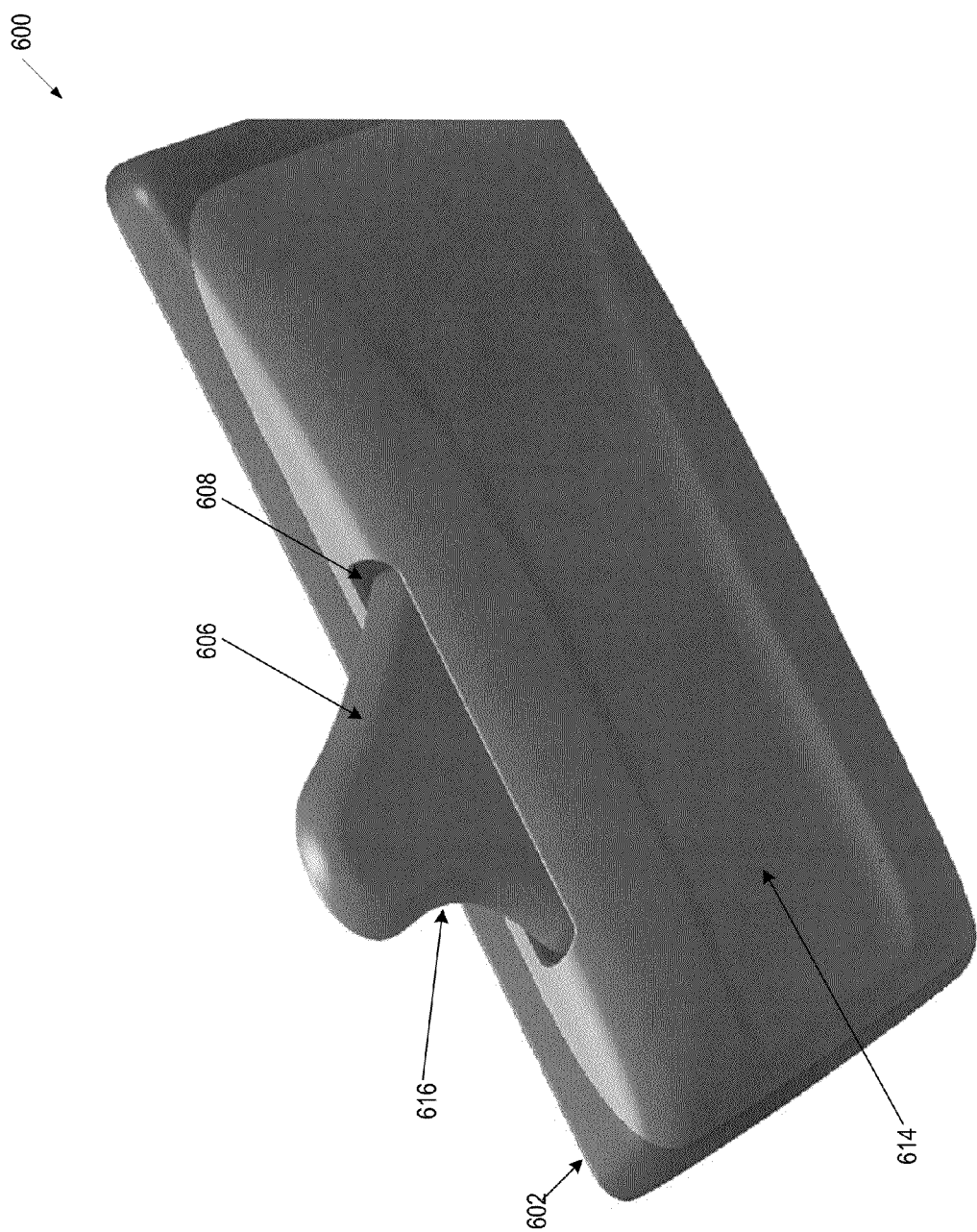
FIG. 6 illustrates a bottom view of one implementation of a case having an arm in an open state.

FIG. 6 illustrates a bottom view of one implementation of a case 600 having an arm 606 in an open state. An open state can include an arm 606 being fully or partially rotated outside of an opening 608 in the body 602 of the case 600. In one implementation, the body 602 includes a locking mechanism to lock the arm 606 in a rotated position. The rotated position can include the arm 606 being in an open state. The body 602 can include a portion that is a recessed are 614. The recessed area 614 can receive the fingertips of the user as the user uses one or more arms 606 to hold the e-reader.

The arm 606 can include a curved area 616 at the base of the arm 606. The arm 606 can include at least one radius that is based on a thenar measurement. The thenar can be the fleshy part of the hand (e.g., human hand) at the base of the thumb. For example, the arm 606 can include the curved area 616 that has a radius designed to comfortably fit the thenar of a hand. In one implementation, the range of radii (in inches) for the curved area 616 is 77" plus or minus 33%. In another implementation, the range of radii (in inches) for the curved area 616 is 77" plus or minus 25%.

Figure 7:
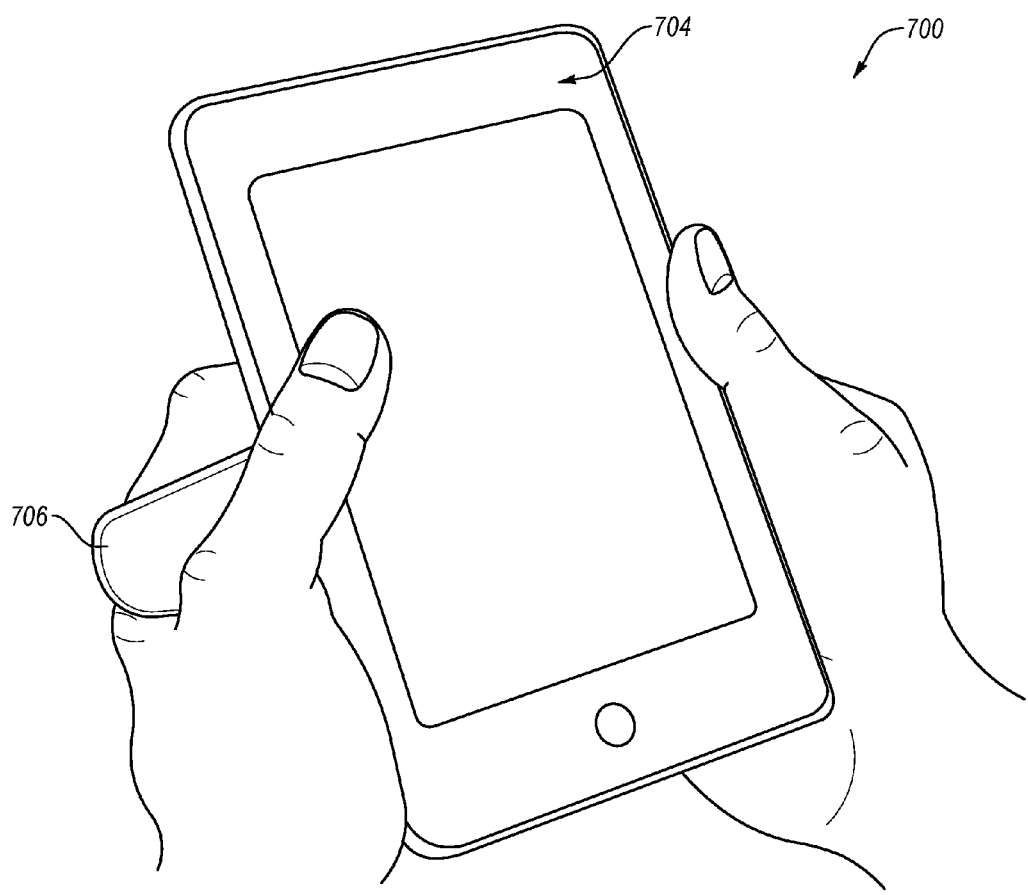
FIG. 7 illustrates a view of one implementation of a case being held by a user.

FIG. 7 illustrates a view of one implementation of a case 700 being held by a user. The arm 706 can be a contoured component that can rest in the webbing between a user's index finger and thumb. Whether the user is right-handed or left-handed, the case 700 can rest on any part of a user's hand with little effort needed from the user to maintain control and balance of the e-reader 704. The case 700 can rest on the webbing of a user's hand, for example, just above the thenar space, as well as other parts of the user's hand.

Implementations of the case 700 can relieve user hand stress by requiring less pressure from a user to grip an e-reader 704. For example, the one or more arms 706 of the case 700 may rest on one or more user hands to require less pressure from the user in holding the e-reader 704.

Implementations of the case 700 can relieve user hand stress by requiring no user pressure. For example, a user may use the e-reader 704 while lying on his or her right or left side, causing the user's head to be at, for example, a 45 degree angle in reference to viewing the e-reader 704. The case 700 can be positioned on an object and/or a surface at an angle (e.g., 45 degree angle) in reference to the user's view of the e-reader 704. For example, the one or more arms 706 may be balanced on an object (e.g., user's legs, pillow, bed, chair, etc.) and/or on a surface (e.g., ground, table, etc.) at an angle.

Figure 8:
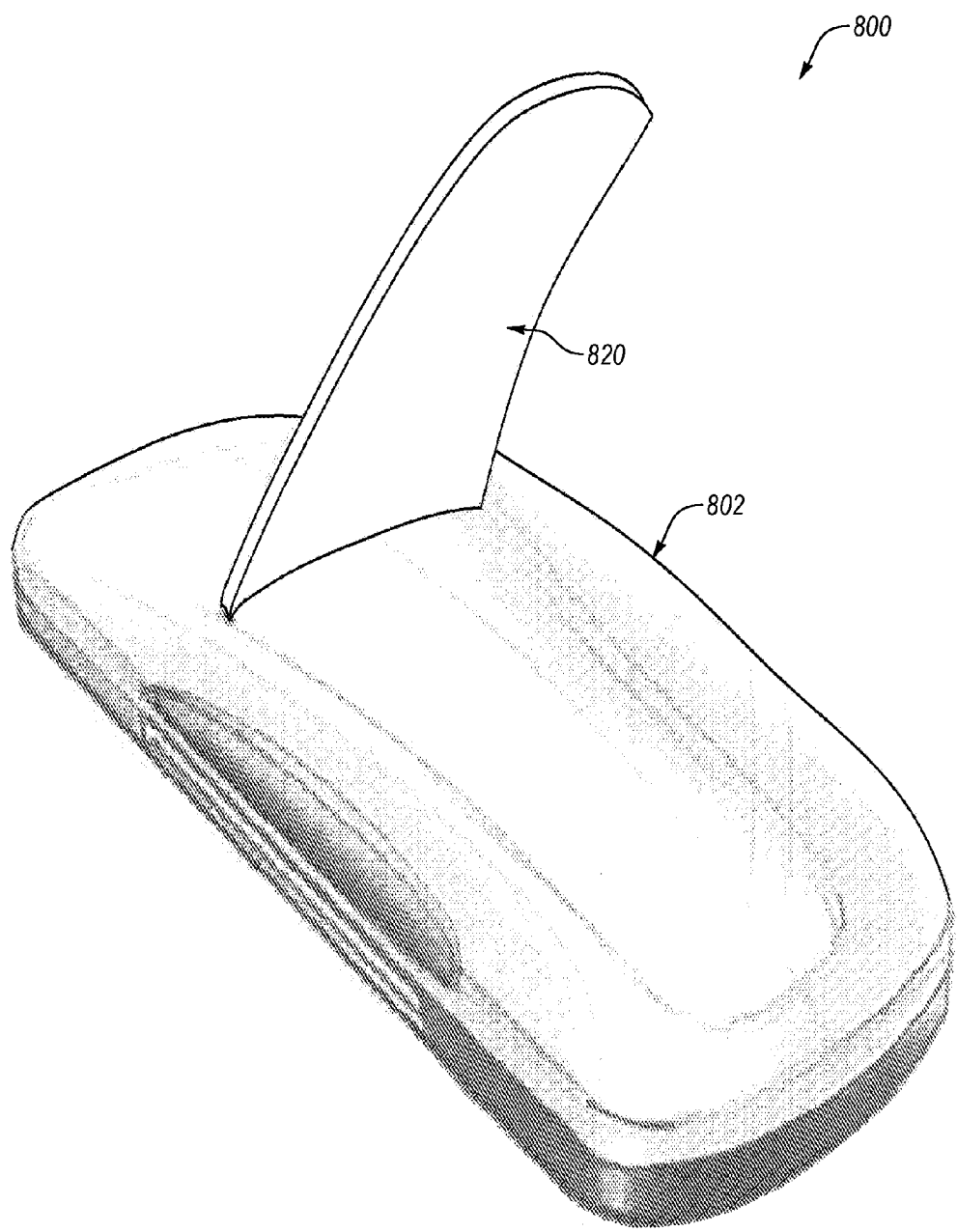
FIG. 8 illustrates a back view of one implementation of a case including a stand.

FIG. 8 illustrates a back view of one implementation of a case 800 including a stand 820. The stand 820 can be housed on the back surface of the body 802. The stand 820 can be coupled towards the top side of the body 802. For example, the stand 820 may be hinged towards the top side of the body 802.

The case (e.g., body, arms) or portions of the case can be manufactured using various types of materials, such as, and not limited to, polymer-based (e.g. plastic), metal, soft rubber, leather, wood, bamboo, rubber, fabric, Velcro®, elastic, magnets, or paper. The type of material used in the design can depend upon customer demand, customer segments, and/or the current market price of materials. In one example, cases can be made of all plastic and rubber. In another example, cases can be made entirely of bamboo.

While certain exemplary embodiments of the invention have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible.

Throughout this document, the term "rotate" as well as varying tenses thereof is generally defined as the angular movement about an axis of rotation (e.g., pivot point). The axis of rotation may be relatively fixed to the overall orientation of the handheld electronic device. For this detailed description, when used to denote a direction of rotation, the term "vertically rotate" (or any tense thereof) relates to rotation about a generally horizontal axis of rotation. Similarly, the term "horizontally rotate" (or any tense thereof) relates to rotation about a generally vertical axis of rotation.

What is claimed is:

1. A case for a handheld electronic device comprising:
a body to support a handheld electronic device, the body comprising a back wall; and
an arm having a first end and a second end, the second end being coupled to the body, the arm comprising at least radius value that is based on a thenar measurement, wherein the second end of the arm is coupled to the body via a pivot point on the body and the arm is rotatable at the pivot point between a holding position and a closed position, wherein when the arm is in the holding position, the arm is substantially parallel with the back wall of the body and the arm being at least partially displaced outside the body from an opening of the body, wherein when the arm is in the closed position, the arm is substantially disposed inside the opening of the body.

2. The case of claim 1, wherein the at least one radius value is within a range of 0.77 inches +/−25%.

3. The case of claim 1, wherein a location of the pivot point is fixed on the body.

4. The case of claim 1, wherein the body comprises:
a first body portion coupled to a top side of the arm; and
a second body portion coupled to a bottom side of the arm.

5. The case of claim 4, wherein a surface of the second body portion is flat.

6. The case of claim 5, wherein a surface of the second body portion comprises a recessed area.

7. The case of claim 6, wherein the second body portion is recessed to receive fingertips in the recessed area.

8. The case of claim 1, wherein the body comprises a locking mechanism to lock the arm in a rotated position.

9. The case of claim 8, wherein the rotated position comprises the arm in a closed state.

10. The case of claim 8, wherein the rotated position comprises the arm in an open state.

11. The case of claim 8, further comprising:
a tension spring to rotate the arm towards the body and away from the body.

12. The case of claim 1, wherein the second end of the arm is coupled to at least one of a left side of the body or a right side of the body.

13. The case of claim 1, wherein the arm comprises padding.

14. The case of claim 1, wherein the second end of the arm is decoupled from a first side of the body and coupled to a second side of the body.

15. The case of claim 1, further comprising:
a stand coupled to a back surface of the body.

16. The case of claim 15, wherein the stand is coupled to a top portion of the body.

* * * * *